B. M. KENT.
DETACHABLE COUPLING.
APPLICATION FILED APR. 3, 1913.
1,117,856.
Patented Nov. 17, 1914.
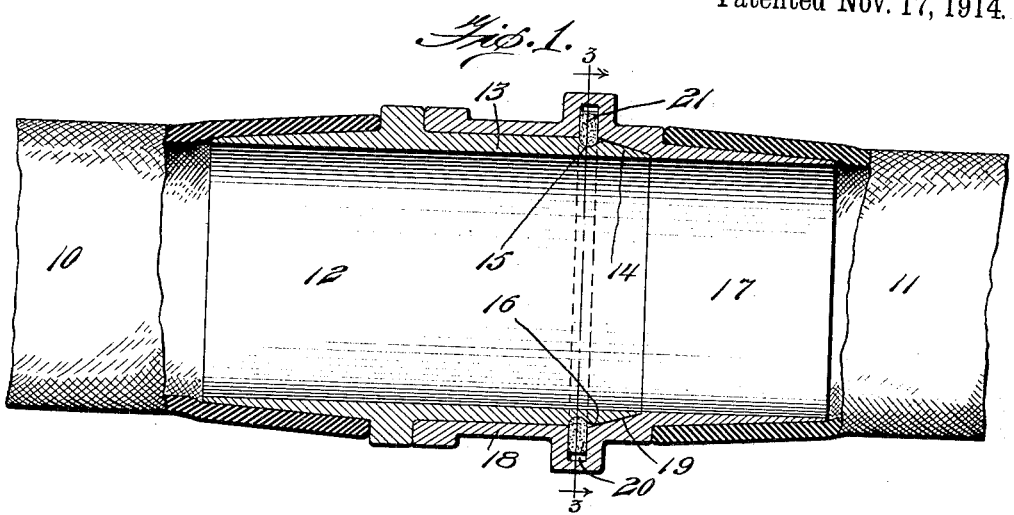
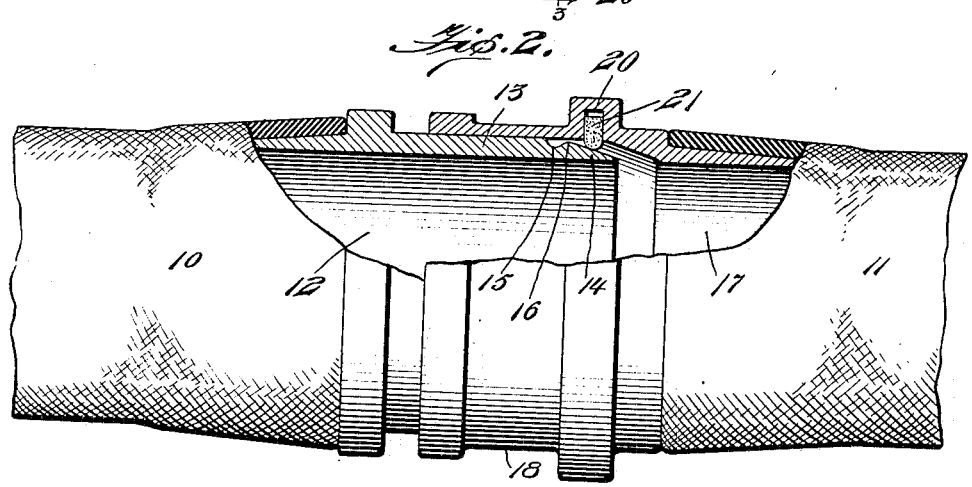
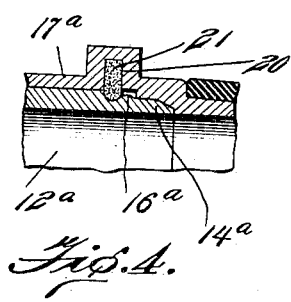
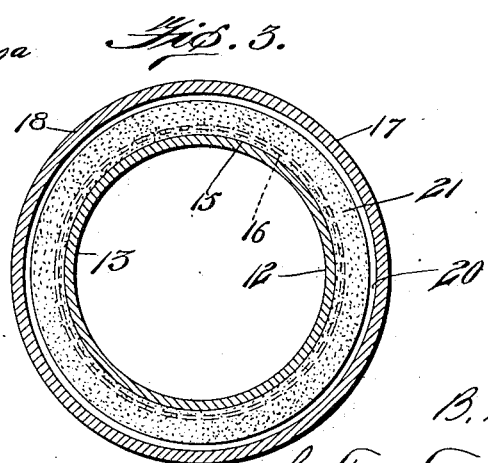
Witnesses
Inventor
B. M. Kent
Attorneys

UNITED STATES PATENT OFFICE.

BERT M. KENT, OF WASHINGTON, DISTRICT OF COLUMBIA, ASSIGNOR OF ONE-THIRD TO FAY T. KENT AND ONE-THIRD TO GORDON E. KENT, BOTH OF ROME, NEW YORK.

DETACHABLE COUPLING.

1,117,856.   Specification of Letters Patent.   Patented Nov. 17, 1914.

Application filed April 3, 1913. Serial No. 758,698.

*To all whom it may concern:*

Be it known that I, BERT M. KENT, a citizen of the United States, and resident of Washington, District of Columbia, have invented certain new and useful Improvements in Detachable Couplings, of which the following is a specification.

This invention relates to hose couplings and more particularly to couplings for low pressure and vacuum hose or tubes and has for its objects the provision of a coupling, the parts of which may be readily separated or put together without the use of a wrench or other tool and which when together do not leak.

Other objects are to provide a coupling of this type which does not require the use of bolts or screws to secure the parts together and which nevertheless is simple in construction and inexpensive to manufacture and the wearing parts of which are readily renewable at a very slight expense.

Another object is to provide a coupling which permits the parts coupled to swivel relatively to each other. This feature is of especial advantage in pneumatic cleaning apparatus for connecting the cleaning tools to the usual tubular handle and also for connecting the tubular handle or other parts to the flexible hose.

Further objects and the features of novelty will be apparent from the following description of the invention, reference being had to the accompanying drawings which illustrate what I now consider to be the most preferable embodiment of the invention, it being understood that the invention is not limited to the form shown.

In the drawings: Figure 1 is a longitudinal section through a coupling; Fig. 2 is a side elevation of the same with parts shown in section and slightly separated; Fig. 3 is a section on the line 3—3 of Fig. 1; Fig. 4 is a fragmentary section showing a modification.

Referring to the drawings, 10 and 11 indicate the ends of two pieces of hose or other tubular members to be coupled. The member 10 has formed integral therewith or secured in the end thereof in any suitable manner, a short tube or male member 12 which is preferably provided with a cylindrical portion 13 and a conical end 14. Between the cylindrical portion and the conical portion is a circumferential groove 15, preferably of substantially semi-circular cross-section. The edge of the groove 15, adjacent the conical end 14 is rounded or chamfered to form a bead, as shown at 16, and the diameter of this bead is slightly less than the diameter of the cylindrical portion 13. The member 11 has formed integral therewith or secured in the end thereof, in any suitable manner, a short tube or female member 17 the interior of which has a cylindrically bored portion 18 to closely fit the portion 13 of the tube 12, but permit the latter to be freely entered into or removed therefrom. The tube 17 also has a portion 19 to receive the end 14 of the tube 12. Between the portions 18 and 19 there is an annular groove or recess 20 in which there is loosely arranged a packing and locking ring 21, which may be of any suitable material but which I prefer to make of rubber or other suitable composition or yielding material. As shown in Figs. 1 to 3, the ring 21 is slightly smaller in diameter than the groove 20, so that when the parts are coupled or uncoupled the ring 21 can expand to permit the bead 16 to pass therethrough.

When the parts are in the position shown in Fig. 1 the ring 21 is contracted to fit the groove 15 and thus prevents leakage and also prevents the parts from being uncoupled by a straight pull. When it is desired to uncouple the parts, one part is rotated or twisted slightly relatively to the other, in addition to being simultaneously subjected to a moderate pull, whereby the ring 21 will readily expand over the bead 16 and permit the parts to be separated. In coupling the parts the tube 12 is inserted into the tube 17 to the position shown in Fig. 2 and then one tube is turned relatively to the other, the tubes being simultaneously pushed together. I have found, in practice, that it is only necessary to give a relative twist of about one-eighth of a revolution to couple or uncouple the parts and it will therefore be seen the operation of coupling and uncoupling is very simple and convenient.

In the form of the invention illustrated in Fig. 4 the ring 21 fills the groove 20ª and when the parts are coupled or uncoupled the ring yields sufficiently to permit the bead 16ª to pass it. In the form the end of the tube 12ª can be made cylindrical as indicated at 14ª and thus provide a long bearing surface and make the parts more firm.

When the ring 21 becomes worn it can be readily removed by means of a pointed tool and a new ring inserted and since these rings are comparatively inexpensive and constitute practically the only wearing part the maintenance of the coupling is an insignificant item.

While I have illustrated and described the invention with reference to tubes it will be understood that it is also applicable to other structural elements and therefore I do not wish to be limited to the illustrations given but claim all applications of the invention that come within the scope of the claims.

I am aware that tubes have been heretofore permanently connected by a spring ring which was arranged in registering grooves in the members of the coupling for the purpose of providing a swivel joint but in all of such constructions of which I am aware, and of which the Patents Nos. 738,503 to Waters and 981,705 to Spencer are typical examples, the parts are not detachable after they are once coupled, and the connecting ring is made of a spring metal and the sides of the grooves are straight so that it would be absolutely impossible to separate the members by pulling and simultaneously giving them a relative twisting movement as in my improved coupling.

Having thus described the invention, what is claimed is:

1. A detachable swivel coupling comprising an outer member having an interior circumferential recess, an inner member having a circumferential groove in its outer surface adapted to register with the recess in the outer member when said members are in coupled relation, and a ring of yielding material loosely arranged in said recesss and spaced from the bottom thereof and adapted to fit said groove to lock said members together, said groove having its inner edge chamfered so as to expand said ring when withdrawing the inner member from the outer member.

2. A detachable swivel coupling comprising an outer member having an interior circumferential recess, an inner member having a circumferential groove in its outer surface adjacent one end thereof and adapted to register with said recess when said members are in coupled relation, a ring of yielding material loosely arranged in said recess and spaced from the bottom thereof and adapted to fit said groove to lock said members together, the end of said inner member provided with said groove having a conical outer surface and the edge of said groove adjacent the conical surface being chamfered for the purpose of expanding said ring to permit the inner member to be withdrawn from the outer member.

3. A detachable swivel coupling comprising two telescopically arranged members having registering annular grooves therein, an expansible ring carried by one of said members in the groove therein and spaced from the bottom of said groove and adapted to fit the other groove to secure said members together, and said other groove having a chamfered edge adapted to permit said ring to be withdrawn therefrom to uncouple said members by giving to one of the members a rotary and axial movement relative to the other.

4. A detachable swivel coupling comprising two telescopically arranged members, the outer of said members having an internal annular recess and the inner member having an annular groove registering with said recess, and an expansible ring carried by the outer member in said recess and the normal outer diameter of which is less than the outer diameter of the recess, said groove having the edge thereof adjacent the inner end of the inner member rounded, for the purpose set forth.

5. A detachable swivel coupling comprising, a male member, a female member, and a locking ring loosely carried on the interior of the female member and having its periphery spaced from the wall of the female member, said ring being adapted to be expanded by the male member in coupling and uncoupling the members, and said male member having a groove in its outer surface into which said locking ring contracts when said members are coupled.

6. A detachable swivel coupling comprising, a male member, a female member, and a locking ring loosely carried on the interior of said female member and protruding from the inner surface thereof, said ring having its periphery spaced from the wall of the female member and said male member having a groove adapted to receive said ring when said members are in coupled relation and being adapted to expand said ring, in uncoupling, by giving one of the members a spiral movement relative to the other.

7. A detachable swivel coupling comprising male and female members having grooves, which register when said members are in coupled relation, and a locking ring of elastic material loosely engaging said grooves and expanded by said male member in coupling and uncoupling said members.

8. A detachable swivel coupling, comprising male and female members having grooves, which register when said members are in coupled relation, and an endless locking ring of elastic material loosely engaging said grooves and spaced from the bottom of one of the grooves and yieldable radially in the latter groove to permit said members to be coupled and uncoupled.

9. A detachable swivel coupling comprising male and female members and an internally arranged locking device adapted to firmly hold said members in coupled relation against a straight longitudinal pull but permitting said members to be readily detached by a spiral or twisting pull, said locking device also constituting the swivel connection between said members.

In testimony whereof I affix my signature in presence of two witnesses.

BERT M. KENT.

Witnesses:
ARTHUR L. BRYANT,
G. P. KRAMER.